United States Patent [19]
Wieser

[11] 3,870,140
[45] Mar. 11, 1975

[54] FEEDING DEVICE FOR A CARTON FORMING MACHINE

[75] Inventor: Louis Wieser, Ecublens, Switzerland

[73] Assignee: J. Bobst & Fils SA, Prilly, Switzerland

[22] Filed: Jan. 23, 1973

[21] Appl. No.: 326,070

[30] Foreign Application Priority Data
Jan. 25, 1972 Switzerland.......................... 1093/72

[52] U.S. Cl................................. 198/190, 198/204
[51] Int. Cl.......................................... B65g 15/12
[58] Field of Search..................... 198/190, 204, 208

[56] References Cited
UNITED STATES PATENTS
2,808,924  10/1957  Wood ................................. 198/208
3,581,878  6/1971  Jacobson ........................... 198/204
3,703,231  11/1972  Montgomery, Jr. ................ 198/190

Primary Examiner—Evon C. Blunk
Assistant Examiner—Richard K. Thomson
Attorney, Agent, or Firm—Hill, Gross, Simpson, Van Santen, Steadman, Chiara & Simpson

[57] ABSTRACT

A conveyor for conveying box blanks in a carton forming machine has a plurality of endless conveyor belts supported in side-by-side relationship, with some of the belts being mounted on carriages for horizontal movement away from other belts, to facilitate removal and replacement of the belts. A belt is removed by being slipped axially from its supporting pulleys. A detachable drive shaft is connected with all of the conveyor belts.

5 Claims, 6 Drawing Figures

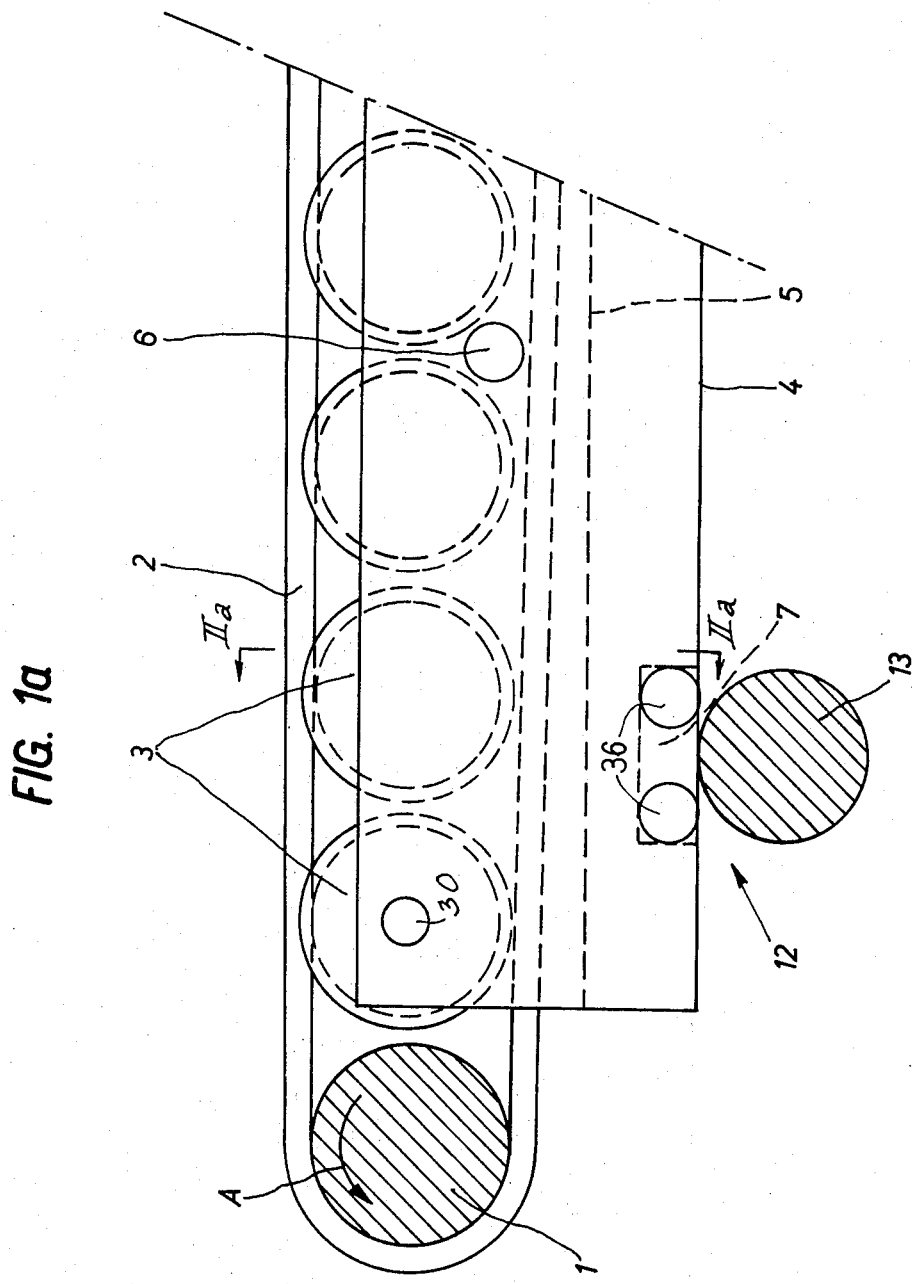

3,870,140

1

FEEDING DEVICE FOR A CARTON FORMING MACHINE

BACKGROUND OF THE INVENTION

1. Field of the Invention

This invention relates to conveyors and more particularly to conveyors adapted for conveying box blanks and the like.

2. The Prior Art

Many mechanisms for conveying box blanks and the like are known in connection with machines for forming box blanks, and among the most satisfactory assemblies of this type are those in which a plurality of endless conveyor belts are mounted in side-by-side relationship, and the blanks are conveyed on the upper surfaces of the conveyor belts. A difficulty arises, however, when one of the belts must be replaced. In known conveying apparatus, replacing a belt has been a relatively complicated and time consuming task. It is therefore desirable to provide a construction for a conveyor which facilitates replacement of the conveyor belts making up such conveyor.

SUMMARY OF THE INVENTION

It is a principal object of the present invention to provide a construction for a conveyor having a plurality of side-by-side endless conveyor belts with means for facilitating replacement of one or all of the belts.

Another object of the present invention is to provide a readily detachable drive connection for the belts of such conveyor, so that the belt supporting assembly may be moved relative to the drive mechanism during replacement of the belts.

These and other objects and advantages of the present invention will become manifest upon an examination of the following description and the accompanying drawings.

In one embodiment of the present invention, there is provided means for supporting a plurality of endless conveyor belts in side-by-side relationship, with pulleys located below the upper reach of said conveyor belts for maintaining the upper reach in a generally horizontal plane, means for mounting the pulleys of each belt between first and second side walls, the first side wall having a perimeter less than that of the belt, a carriage for supporting the second side wall, the carriage being movable in a horizontal direction relative to the other belts, and means for providing a selectively detachable drive connection for each of said belts, such connection being automatically disconnected by horizontal movement of said carriage.

BRIEF SUMMARY OF THE DRAWINGS

Reference will now be made to the accompanying drawings in which.

2

DESCRIPTION OF THE PREFERRED EMBODIMENT

Figure 1B:
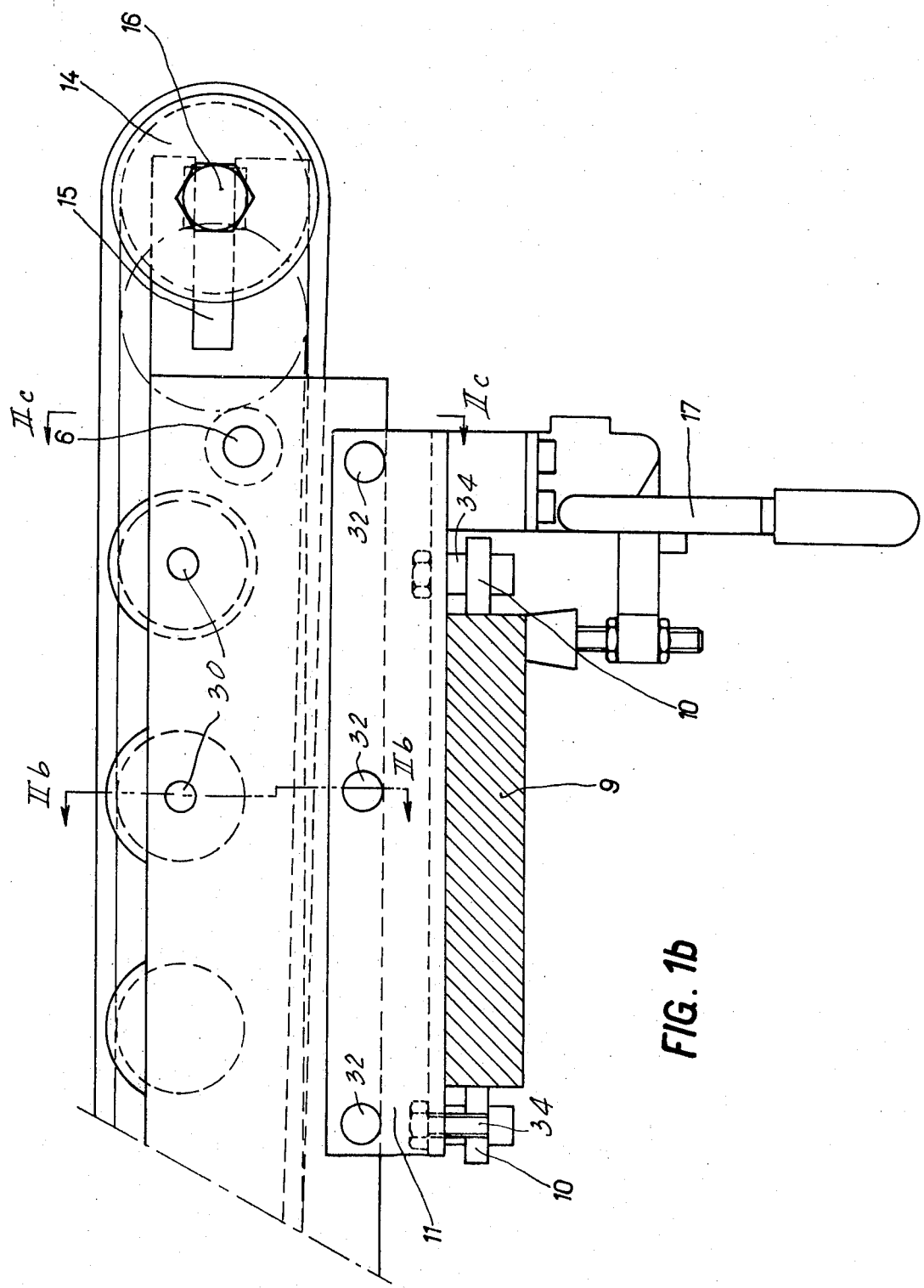
FIG. 1, which is the composite of FIGS. 1a and 1b, is a side elevation, partly in cross section, of a conveyor constructed in accordance with an illustrative embodiment of the present invention.
Figures 2A, 2B, 2C:
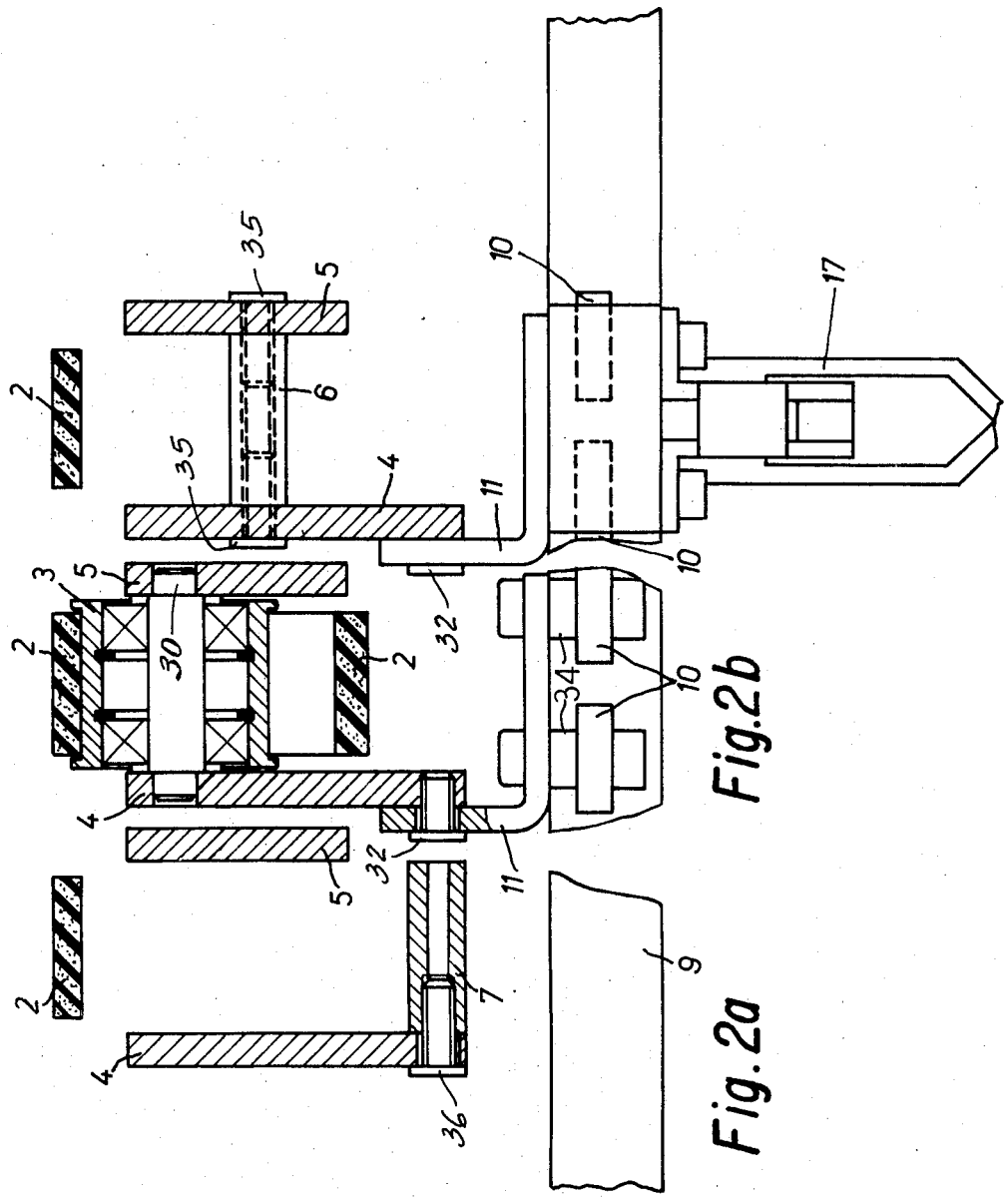
FIGS. 2a, 2b, and 2c are end elevations, partly in cross section, of the conveyor of FIG. 1 taken at section lines IIa, IIb, and IIc, respectively.

Referring now to FIGS. 1 and 2a–2c, there is shown a plurality of endless conveyor belts 2 mounted in side-by-side relationship with the upper reach of each of the belts arranged to define a horizontal plane. Each of the belts 2 is supported in a manner shown in FIG. 1 with a drive shaft 1 at one end of the belt 2, and an end pulley 14 at the other end of the belt 2, with several additional pulleys 3 having a lesser diameter than the drive shaft 1 for supporting the mid portion of the upper reach of the belt 2. The three conveyors of FIG. 2a–2c are shown (from left to right) at cross-sections IIa, IIb and IIIc in FIGS. 1a and 1b, respectively, to better illustrate the construction. The lower reach of the belt 2 is omitted for two of the three conveyors, for clarity.

The pulleys 30 are supported on shafts 20 mounted between first and second side walls 4 and 5. The side wall 5 is smaller than the wall 4 in its vertical dimension, such vertical dimension being less than the distance between the upper and lower reaches of the belt 2. The length of the side wall 4 is also shorter than the length of the belt 2, so that the entire perimeter of the side wall 4 is less than the perimeter of the belt 2.

The two walls 4 and 5 are spaced apart by means of bars 6, which serve to space the walls 4 and 5 the proper distance apart. Screws or rivets 35 rigidly secure the bars 6 to the walls 4 and 5 at both ends. The lower portion of the wall 4 is connected by rivets 32 to an L-shaped carriage 11 which is mounted to a carriage adapted for sliding in a horizontal direction relative to a supporting beam 9. A plurality of rollers 10 are secured to the carriage 11, by pins 34, and are adapted to roll on opposite sides of the beam 9, as illustrated in FIG. 1b, to permit sliding movement of the carriage 11 and the conveyor assembly supported thereon in a horizontal direction relative to the beam 9. The forward end of each wall 4 has a slide bar 7 secured thereto by means of bolts 26, and the slide bars rest on a shaft 13 fixed to the frame of the machine. The slide bars 7 are free to slide along the shaft 13 as the conveyors move along the beam 9.

The side walls 4 and 5 are each provided with a slot 15 at one end thereof, and the pulley 14 is mounted on a shaft which is slidable in the slot 15. The position of such shaft is fixed in relation to the side walls 4 and 5 by means of bolts 16 which, when tightened, secure the pulley 14 in fixed relation to the walls 4 and 5. The slot 15 permits the belt 2 to be slackened when the bolt 16 is unscrewed, and the pulley 14 is moved into the slot 15. With the belt 2 thus slackened, it can easily be removed from the pulleys 3 and 14 by slipping it off in an axial direction. The relatively small size of the wall 5, and the manner of its support on the wall 4 allows the belt 2 to be slipped easily over the wall 5 when it is removed. The drive shaft 1 can be disconnected and/or removed, so that it does not interfere with belt removal and replacement.

The belt shown at the right hand end of FIG. 2 is easily replaced without requiring movement of the carriage 11, but when one of the intermediate belts is to be replaced, the carriage for at least the right hand conveyor belt must be moved away from the belt to be replaced. Such carriages are then slid along the beam 9, thereby permitting access to the belt which is to be replaced. Then the belt to be replaced is removed from its pulleys and slipped over its side wall 5, and a new belt placed in position in the same manner.

When all of the belts are in proper position on their pulleys, the carriages 11 of each of them are slid along the beam 9 to locate the belts in side-by-side relationship, and then a clamp 17 is tightened to hold the right hand carriage 11 against the beam 9. The left hand conveyor (as shown in FIG. 2) is not provided with a carriage, and its wall 4 is fixed to the beam 9 by means not shown. Thus, the intermediate conveyor is trapped in position between the endmost conveyors, and is thereby located in correct position without the need for a clamp 17.

Figure 3:
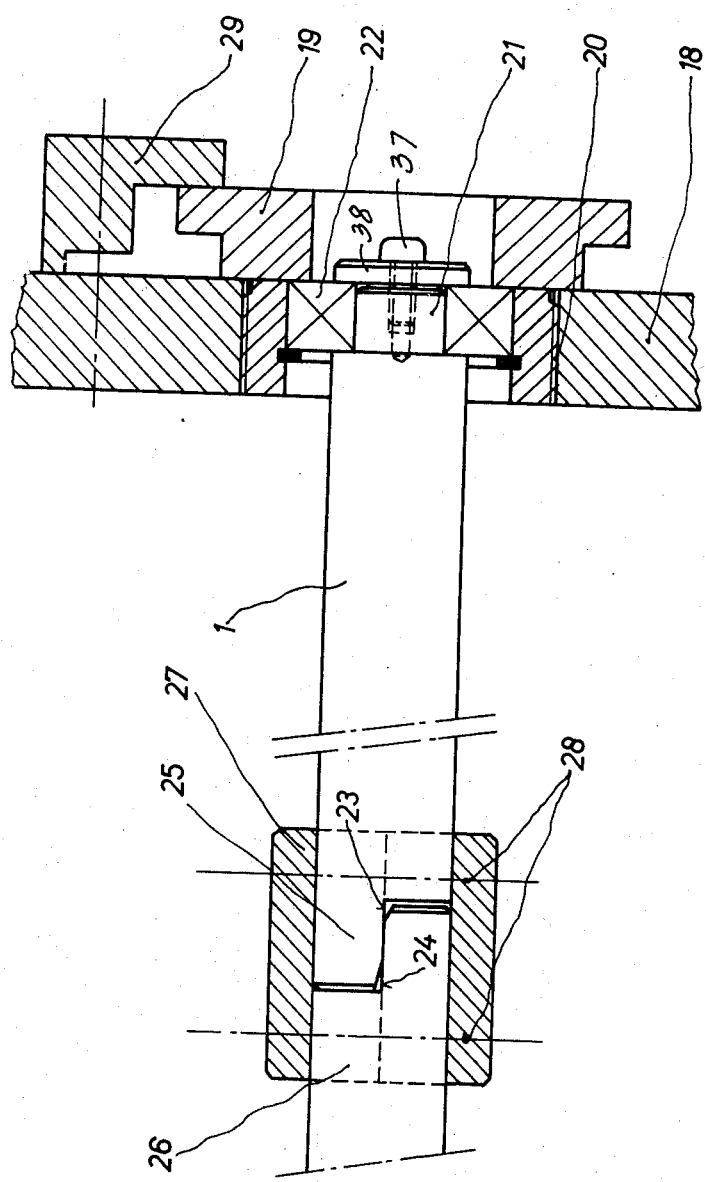
FIG. 3 is a detail, partly in cross section, illustrating a detachable drive connection for one of the conveyor belts illustrated in FIGS. 1 and 2.

Referring now to FIG. 3, the detachable drive connection employed for the drive pulleys 1 is illustrated in detail. A shaft 26 is connected to the motor drive (not shown) for the machine and it terminates in a stepped end section having a flat surface 24. The drive shaft 1 has the same diameter as the shaft 26, and is coupled thereto by means of a coupler 27 which surrounds the end of the shaft 26 and the end of the shaft 1. The shaft 1 is provided with a stepped end section having a flat surface 23, which cooperates with the flat 24 of the shaft 26, so that the drive shaft 1 is in driven relationship with the shaft 26 when the coupler 27 is in position. However, the shaft 1 may be moved longitudinally away from the shaft 26 to automatically disengage the coupler 27, and to allow the replacement of a belt 2 without interfering with the drive connection.

The end of the shaft 1 remote from the coupler 27 is supported in a ball bearing 22 supported in a bearing holder 19 which is received within an aperture 20 is a wall 18 of the frame of the machine. An extention 21 is secured to the end of the shaft 1 by means of a screw 37, and is received within the ball bearing 22. A flange 38, secured to the end of the extension 21 by the screw 37, holds the bearing 22 in place. The holder 19 is releasably clamped to the wall 18 by means of clamp member 29.

When the shaft 1 is to be removed, it is only necessary to release the clamp 29, whereupon the shaft 1 may be slid axially through all of the belts 2, freeing them for removal and replacement. The coupler 27 allows axial movement of the shaft 1. Only the ends of the shaft 1 are shown in FIG. 3, and it is understood that the several belts 2 surround the middle portion of the shaft 1 which is not illustrated.

From the foregoing description it can be seen that any of the belts 2 may readily be removed and replaced. One or more of the carriages are simply moved away from the belt to be replaced, automatically disengaging the drive for the belts supported on the carriages which are moved, and exposing the belt to be replaced.

Although the present invention has been described specifically in connection with apparatus for handling box blanks, other applications will be evident to those skilled in the art.

What is claimed is:

1. In conveyor apparatus having a plurality of endless conveyor belts mounted in side-by-side relationship with the upper reaches of said belts defining a horizontal surface, the combination comprising: a separate supporting carriage for one of said conveyor belts, said carriage comprising first and second walls fixed in relationship to each other, a plurality of pulleys extending between said side walls for supporting one of said belts therebetween, means for supporting said first side wall for horizontal sliding movement away from an adjacent conveyor belt, said second side wall being supported by said first side wall and having a perimeter less than the perimeter of said belt, whereby said belt may be removed by being slipped from said pulleys and over said second side wall, and means for driving said conveyor belts including a detachable drive connection.

2. Apparatus according to claim 1, wherein one of said pulleys supports said endless belt where said belt makes a loop around said pulley, and adjustable means for adjustably mounting said one pulley relative to said side walls.

3. In a conveyor apparatus having a conveyor defining a horizontal conveying surface, the combination comprising: a plurality of pairs of side walls, each pair comprising first and second side walls fixed in relationship to each other, a plurality of endless belts each disposed in side-by-side relationship between said first and second side walls of an individual pair of side walls, a plurality of pulleys for supporting each of said belts, said pulleys extending between the side walls of an individual pair of side walls, said second side wall of each pair being supported by said first side wall and having a perimeter less than that of one of said belts, whereby one of said belts may be removed by being slipped from the pulleys and over said second side wall detachable means for driving said conveyor belt including a drive shaft for each of said belts disposed in coaxial relation, a single beam disposed in parallel relationship with the axes of said drive shafts, and supporting means for supporting the pulleys of each belt independently on said beam.

4. Apparatus according to claim 3, including means for sliding said supporting means for one belt along said beam.

5. Apparatus according to claim 4, including clamp means for clamping one of said supporting means against said beam.

* * * * *